US011626003B2

(12) United States Patent
Ardha et al.

(10) Patent No.: US 11,626,003 B2
(45) Date of Patent: Apr. 11, 2023

(54) SYSTEMS AND METHODS FOR MONITORING AND DETECTING A FAULT IN A FLUID STORAGE TANK

(71) Applicant: Rheem Manufacturing Company, Atlanta, GA (US)

(72) Inventors: Vishwanath Reddy Ardha, Montgomery, AL (US); Atilhan Manay, Roswell, GA (US); Divakar Mantha, Montgomery, AL (US); Edward Holman, Roswell, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 17/182,608

(22) Filed: Feb. 23, 2021

(65) Prior Publication Data
US 2022/0270465 A1 Aug. 25, 2022

(51) Int. Cl.
G08B 21/18 (2006.01)
G01N 29/44 (2006.01)
G01N 29/14 (2006.01)

(52) U.S. Cl.
CPC ........... *G08B 21/182* (2013.01); *G01N 29/14* (2013.01); *G01N 29/4427* (2013.01)

(58) Field of Classification Search
CPC ... G08B 21/182; G01N 29/14; G01N 29/4427
See application file for complete search history.

(56) References Cited

U.S. PATENT DOCUMENTS

| 5,333,240 A | 7/1994 | Matsumoto et al. |
| 5,839,383 A * | 11/1998 | Stenning ................. F17C 1/002 114/74 R |
| 6,079,252 A | 6/2000 | Tabler et al. |
| 6,553,809 B1 * | 4/2003 | Hayward ............. G01N 29/227 73/41 |
| 2005/0149277 A1 * | 7/2005 | Bailey .................. G01N 29/024 702/56 |
| 2007/0003450 A1 | 1/2007 | Burdett et al. |
| 2007/0050115 A1 * | 3/2007 | Discenzo ................ B66C 13/22 701/50 |

(Continued)

FOREIGN PATENT DOCUMENTS

| CN | 111189767 A | 5/2020 |
| JP | 2008292319 A | 12/2008 |

OTHER PUBLICATIONS

International Search Report and the Written Opinion of International Application No. PCT/US2022/016511 dated May 26, 2022.

*Primary Examiner* — Ojiako K Nwugo
(74) *Attorney, Agent, or Firm* — Eversheds Sutherland (US) LLP

(57) ABSTRACT

The disclosed technology can include a system for monitoring and detecting a fault in a fluid storage tank. A sensor can be located in, on, or proximate the fluid storage tank and can be configured to detect waveforms produced by the fluid storage tank in response to strain. The sensor can convert such waveforms into electrical signals and transmit such electrical signals in the form of vibration data to a controller. The controller can compare the vibration data to stored data, and based on such comparison, determine if a fault is present in the fluid storage tank.

20 Claims, 5 Drawing Sheets

(56) References Cited

U.S. PATENT DOCUMENTS

| | | |
|---|---|---|
| 2010/0082274 A1 | 4/2010 | Son et al. |
| 2011/0238352 A1* | 9/2011 | Griessbaum .......... G01F 23/284 702/100 |
| 2011/0301883 A1* | 12/2011 | Murphy ................ G01S 15/102 702/55 |
| 2012/0229290 A1 | 9/2012 | Gerez et al. |
| 2016/0054212 A1* | 2/2016 | McAnally .............. G01N 11/16 73/32 A |
| 2016/0175633 A1* | 6/2016 | Smith ................... A62C 3/0214 169/61 |
| 2017/0213441 A1* | 7/2017 | Welin ..................... G01H 1/003 |
| 2018/0001350 A1 | 1/2018 | Werlink |
| 2020/0040787 A1* | 2/2020 | Brandt ............... G01N 29/4427 |
| 2020/0284252 A1* | 9/2020 | Stark ...................... F04B 49/065 |
| 2020/0295250 A1* | 9/2020 | Li .......................... G01H 11/08 |
| 2020/0363289 A1 | 11/2020 | Shekhar et al. |

* cited by examiner

SYSTEMS AND METHODS FOR MONITORING AND DETECTING A FAULT IN A FLUID STORAGE TANK

FIELD OF THE DISCLOSURE

The present invention relates generally to systems and methods for monitoring and detecting a fault in a fluid storage tank, and more particularly, to systems and methods for monitoring and detecting a fault and/or a potential fault in a fluid storage tank using acoustic emission technology.

BACKGROUND

Residential homes and commercial entities can have various plumbing systems and appliances capable of storing and handling water, including fluid storage tanks, water heaters, washing machines, dishwashers, sinks, and the like. Failures of such systems and appliances can result in significant water loss and damage to the appliance, system, or surrounding objects. For example, a single crack in a fluid storage tank can result in substantially all of the water stored within the fluid storage tank leaking out of the fluid storage tank within a day, thereby potentially resulting in significant property damage. The potential for significant property damage can be even greater if the fluid storage tank is located in an elevated location, such as in an attic of a home. Because of the significant damage and financial costs that can result from water leaks, it can be critical to quickly detect a crack (or a hole or some other undesired release of water) and/or to prevent a crack or hole from developing in the first place.

Certain diagnostic tools exist that can monitor a fluid storage device and detect a crack in the fluid storage device or associated fluid system. Diagnostic tools can assist owners in taking corrective actions to mitigate water loss, property damage, and associated financial loss that can result from such cracks. Further, diagnostic tools can be useful technicians performing maintenance by increasing the ease and efficiency in detection of cracks, thereby decreasing time and labor costs and decreasing the potential for misidentification or mischaracterization of the type of fault and/or the severity of the fault.

However, traditional diagnostic tools can have several drawbacks. For example, typical diagnostic tools can only detect a crack once the crack is formed, thus lacking the ability to generate a prognosis and/or identify corrective measures. Thus, a user may be unable to proactively identify a future or potential crack and take any necessary steps to mitigate the formation of the crack. Additionally, many traditional diagnostic tools are used to detect a crack in a particular location and cannot examine all portions of the fluid storage tank (e.g., locations that difficult to access).

Lastly, a sacrificial anode rod can be used to mitigate and/or prevent corrosion. Additionally, examining the water quality of water within the fluid storage tank can provide an indication on the health of a fluid storage tank. However, these indirect mechanisms of mitigating corrosion and/or estimating the structural integrity of a fluid storage tank do not provide a user the ability to directly detect a crack or conditions that could result in a crack and can, thus, be inefficient and lead to mischaracterization of the severity of cracks and potential cracks.

SUMMARY

These and other problems can be addressed by the technologies described herein. Examples of the present disclosure relate generally to systems and methods configured to monitor and detect a fault or potential fault in a fluid storage tank based at least in part on acoustic data detected upon a fluid storage tank being subjected to strain. Upon detecting a fault or potential fault in the fluid storage tank an owner or technician can take any necessary corrective or preventive actions to mitigate or prevent water leaks resulting in financial and property damage.

The disclosed technology can include a system including a fluid storage tank, a sensor positioned proximate the fluid storage tank and being configured to detect vibrations associated with the fluid storage tank and output vibration data indicative of the detected vibrations, a processor, and non-transitory computer readable-medium that stores instructions, that when executed by the processor, cause the system to receive the vibration data, compare the vibration data to stored data, and determine, based on the comparison of the vibration data to the stored data, whether a fault is present in the fluid storage tank.

The sensor can be a piezoelectric sensor.

The fault can be at least one of corrosion, a microcrack, or a crack.

The sensor can record the vibration data over a predetermined period of time.

The sensor can transmit the vibration data a predetermined number of times during a predetermined period of time.

The vibration data can be indicative of at least one waveform characteristic and the stored data comprises at least one waveform characteristic corresponding to the at least one waveform characteristic of the vibration data and the at least one waveform characteristic of the stored data can be indicative of vibrations associated with the fluid storage tank in which a fault does exist.

The instructions, when executed by the processor can further cause the system to determine the vibration data includes a predetermined amount of detected vibrations greater than a first threshold value over a first predetermined period of time and determine the fault is a first fault having a first level of severity.

The step of determining the fault is the first fault having the first level of severity can be based at least in part on a determination that the vibration data includes the predetermined amount of detected vibrations greater than the first threshold value and less than a second threshold value over the first predetermined period of time, the second threshold value being greater than the first threshold value. In such instance, the instructions, when executed by the processor can further cause the system to determine the vibration data includes a predetermined amount of detected vibrations greater than the second threshold value over a second predetermined period of time and determine the fault is a second fault having a second level of severity, the second level of severity being greater than the first level of severity.

The step of determining the fault is the second fault having the second level of severity can be based at least in part on a determination that the vibration data includes the predetermined amount of detected vibrations greater than the second threshold value and less than a third threshold value over the second predetermined period of time, the third threshold value being greater than the second threshold value. In such instance, the instructions, when executed by the processor can further cause the system to determine the vibration data includes a predetermined amount of detected vibrations greater than the third threshold value over a third predetermined period of time and determine the fault is a third fault having a third level of severity, the third level of severity being greater than the second level of severity.

The first, second, and third predetermined periods of time can be the same. Alternatively, one, some, or all of the first, second, and third predetermined periods of time can be different.

The first fault can be corrosion, the second fault can be a microcrack, and the third fault can be a crack.

The instructions, when executed by the processor can further cause the system to determine a first fault having a first level of severity is present in the fluid storage tank and determine an estimated amount of time until a second fault of a second level of severity occurs in the fluid storage tank, the second level of severity being greater than the first level of severity.

The instructions, when executed by the processor can further cause the system to output display data for display on a display device, the display data being based at least in part on the determined fault.

The instructions, when executed by the processor can further cause the system to output a signal to an alarm system to produce a notification in response to determining the fault is present in the fluid storage tank.

The disclosed technology can further include a method of monitoring and detecting a fault in a fluid storage tank including receiving, from a sensor, vibration data, the vibration data being indicative of one or more detected vibrations associated with the fluid storage tank; comparing the vibration data to stored data; and determining, based on the comparison of the vibration data to the stored data, if the fault is present in the fluid storage tank.

The vibration data can be indicative of at least one waveform characteristic and the stored data comprises at least one waveform characteristic corresponding to the at least one waveform characteristic of the vibration data and the at least one waveform characteristic of the stored data can be indicative of vibrations associated with the fluid storage tank in which a fault does exist.

The method can further include determining the vibration data includes a predetermined number of detected vibrations greater than a first threshold value over a first predetermined period of time and determining the fault is a first fault having a first level of severity.

The step of determining the fault is the first fault having the first level of severity can be based at least in part on a determination that the vibration data includes the predetermined amount of detected vibrations greater than the first threshold value and less than a second threshold value over the first predetermined period of time, the second threshold value being greater than the first threshold value. In such instance, the method can further include determining the vibration data includes a predetermined number of detected vibrations greater than the second threshold value over a second predetermined period of time and determining the fault is a second fault having a second level of severity, the second level of severity being greater than the first level of severity.

The step of determining the fault is the second fault having the second level of severity can be based at least in part on a determination that the vibration data includes the predetermined amount of detected vibrations greater than the second threshold value and less than a third threshold value over the second predetermined period of time, the third threshold value being greater than the second threshold value. In such instance, the method can further include determining the vibration data includes a predetermined number of detected vibrations greater than the third threshold old value over a third predetermined period of time and determining the fault is a third fault having a third level of severity, the third level of severity being greater than the second level of severity.

The first, second, and third predetermined periods of time can be the same. Alternatively, one, some, or all of the first, second, and third predetermined periods of time can be different.

The method can further include determining a first fault having a first level of severity is present in the fluid storage tank and determining an estimated amount of time until a second fault having a second level of severity occurs in the fluid storage tank, the second level of severity being greater than the first level of severity.

The method can further include outputting display data for display on a display device, the display data being based at least in part on the determined fault.

These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE FIGURES

Reference will now be made to the accompanying figures, which are not necessarily drawn to scale, and wherein.

DETAILED DESCRIPTION

Figure 1:
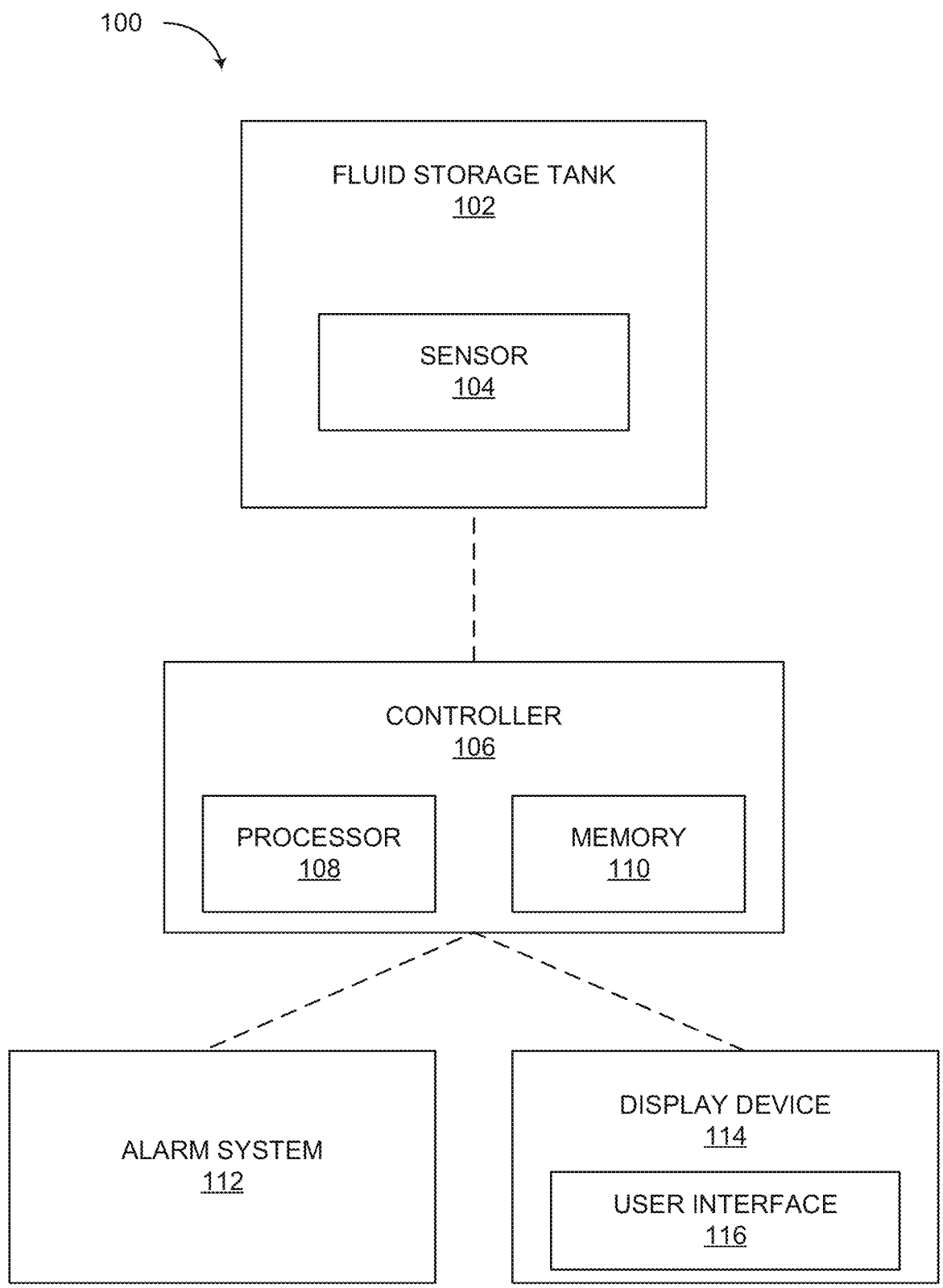
FIG. 1 is a schematic diagram of an example system configured to monitor and detect a fault in a fluid storage tank, in accordance with the disclosed technology.

To facilitate an understanding of the principles and features of the disclosed technology, various illustrative examples are explained below. The disclosed technology can include systems and methods for monitoring and detecting a fault (e.g., corrosion, a microcrack, and/or a crack) in a fluid storage tank. Detection of such faults can help mitigate and/or prevent water leaks in the fluid storage tank and/or associated fluid system. A sensor can be located in, on, or proximate the fluid storage tank and can be configured to detect waveforms (e.g., acoustic vibrations) produced by the fluid storage tank when the fluid storage tank is subjected to wear and strain. The sensor can convert such waveforms into electrical signals and send such electrical signals in the form of acoustic data to a controller. The controller can compare the acoustic data to one or more stored threshold values and, based on the comparison, determine if a fault is present in the fluid storage tank. Optionally, the controller can identify the fault based at least in part on the acoustic data. The controller can output a notification for a user (e.g., a technician) identifying the presence and/or type of fault detected. Optionally, the notification can include instructions for repairing or preventing the fault and/or can help facilitate repair or prevention of the fault (e.g., by providing a list of materials required and/or providing one or more links for purchase of materials required).

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Such other components not described herein may include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," "one example," "an example," "some examples," "certain examples," "various examples," etc., indicate that the embodiment(s) and/or example(s) of the disclosed technology so described may include a particular feature, structure, or characteristic, but not every embodiment necessarily includes the particular feature, structure, or characteristic. Further, repeated use of the phrase "in one embodiment" or the like does not necessarily refer to the same embodiment, example, or implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Unless otherwise specified, all ranges disclosed herein are inclusive of stated end points, as well as all intermediate values. By way of example, a range described as being "from approximately 2 to approximately 4" includes the values 2 and 4 and all intermediate values within the range. Likewise, the expression that a property "can be in a range from approximately 2 to approximately 4" (or "can be in a range from 2 to 4") means that the property can be approximately 2, can be approximately 4, or can be any value therebetween. Further, the expression that a property "can be between approximately 2 and approximately 4" is also inclusive of the endpoints, meaning that the property can be approximately 2, can be approximately 4, or can be any value therebetween.

Unless otherwise specified, the terms fluid, liquid and/or water disclosed herein are inclusive of pure water ($H_2O$) and pure water plus any additives or additional component. Further, while the disclosed technology is referenced as be useful for water applications, it is to be understood that the disclosed technology can be used for any fluid, liquid or otherwise.

Referring now to the figures, FIG. 1 is a schematic diagram of an example system 100 for monitoring and detecting a fault in a fluid storage tank 102. The fluid storage tank 102 can be any structure configured to hold fluid (e.g., water). The fluid storage tank 102 can be a component of a fluid heating device (e.g., a gas water heater, electric water heater, boiler, generator, and the like). The fluid storage tank 102 can be any shape and can be configured to hold any amount of fluid at any pressure. The fluid storage tank 102 can optionally include a coating on its inner wall to mitigate and/or prevent corrosion and/or cracks and maximize the lifespan of the fluid storage tank 102. The coating can be a glass coating, a ceramic coating (e.g., a porcelain coating), or the like. Optionally, the fluid storage tank 102 can be disposed within an outer housing of a fluid heating device (e.g., water heater). A layer of insulation (e.g., polyurethane foam) can be disposed between the outer wall of the fluid storage tank 102 and the outer housing to reduce loss of stored thermal energy and mitigate water leaking from a crack in the fluid storage tank 102.

A sensor 104 can be located in (e.g., inside the tank 102), on (e.g., on an external surface of the tank 102), or proximate the fluid storage tank 102 (e.g., near but not necessarily touching the tank 102, touching a component in communication with the tank 102, near but not touching a component in communication with the tank 102). As non-limiting examples, the sensor 104 can be disposed on or near the bottom of the fluid storage tank 102; underneath the fluid storage tank 102; on an inner or outer side wall of the fluid storage tank 102; at a location external to and proximate the fluid storage tank; and coupled to, disposed within, disposed on, or positioned proximate a fluid heating device in communication with the fluid storage tank 102 (e.g., coupled to an outer housing of the fluid heating device). The sensor 104 can be configured to detect sounds, vibrations, and/or other elastic waves (referred to herein generally as "waveforms"). The detected waveforms can have characteristics (e.g., frequency) that are within a human hearing range. Alternatively, the detected waveforms can have characteristics (e.g., amplitude and/or frequency) that are outside of such human hearing range. As explained more fully herein, the detected waveforms can be indicative of strain on the fluid storage tank 102. The sensor 104 can convert the detected waveforms into electrical signals (e.g., vibration data and/or acoustic data, collectively referred to herein as "acoustic data"). The sensor 104 can be or include a piezoelectric sensor. Alternatively or in addition, the sensor 104 can be or include a transducer, a microphone, a capacitive displacement sensor, a strain gauge sensor, and/or any other sensor capable of measuring sound and/or vibration.

Although only one sensor 104 is depicted in FIG. 1, it is contemplated that the system 100 can include any number of sensors 104. The number of sensors 104 can depend on, for example, the size of the fluid storage tank 102. Alternatively or in addition, more than one sensor 104 can be included to increase the accuracy of the system 104. A calibration test can be administered to determine if a single sensor can detect waveforms produced by the entirety of the fluid storage tank 102, and if not, an additional sensor(s) can be disposed in, on, or proximate the fluid storage tank 102, such that, together, the sensors 104 can capture waveforms produced throughout the entire fluid storage tank 102. Ensuring the sensor(s) 104 can detect waveforms produced by the entirety of the the fluid storage tank 102 allows the system 100 to detect a fault in any location of the fluid storage tank 102 as compared to localized detection.

The system 100 can include a controller 106. The sensor 104 can be in electrical communication with the controller 106 such that the sensor 104 can transmit the electrical signals produced by the fluid storage tank 102 as, for example, acoustic data, to the controller 106, and the controller 106 can receive the acoustic data. The controller 106 can be a computing device having a processor 108 and a memory 110. The controller 106 can be configured to send and receive wireless or wired signals, and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller 106 and the other components. For example, the controller 106 can have a hard-wired 24 VDC connection to various components. Alternatively, the components can be powered directly from a power source and receive control instructions from the controller 106 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 106 can utilize a combination of wireless, hard-wired, and analog or digital communication signals to communicate with and control the various components. One of skill in the art will appreciate that the above configurations are given merely as non-limiting examples and the actual configuration can vary depending on the application.

The memory 110 can be a non-transitory computer readable medium that stores instructions that, when executed by the processor 108, cause the controller 106 to perform certain actions, such as those described herein. The memory 110 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques described herein can be implemented as a combination of executable instructions and data within the memory 110.

Optionally, the controller 106 can be in communication with an alarm system 112. In response to the system 100 detecting a fault (e.g., corrosion, microcrack, crack, or the like) in the fluid storage tank 102, the controller 106 can be configured to output instructions for the alarm system 112 to provide a notification (e.g., output an alarm). In response, the alarm system 112 can output an alert to an owner, technician, or other user. Optionally, the alert can include information based at least in part on the detected fault. Optionally, the alert can include an audible sound. The alarm system 112 can be installed in an owner's house or a commercial structure. Alternatively, or in addition to, the alarm system 112 can be an application on an owner, technician, or other user's remote device (e.g., a mobile device, computer system, and/or the like).

Optionally, the controller 106 can be configured to communicate with a display device 114. The display device 114 can be configured to display data, instructions, and the like to a user. The display device 114 can be integrated into a housing with the controller 106 or installed remotely from the controller 106. If the display device 114 is installed remotely from the controller 106, the display device 114 can be in wired or wireless communication with the controller 106.

Optionally, the display device 114 can be a remote device (e.g., a user's mobile device or other handheld device) that is in communication with the controller 106 (e.g., directly, via one or more networks). Optionally, a mobile application can be installed on the remote device. The mobile application can receive and display data, information, instructions, and the like based at least in part on the acoustic data transmitted by the sensor and the determined fault. Technicians, owners, and other users can use the mobile application to monitor health of the fluid storage tank 102, detect one or more fault and/or conditions that could give rise to one or more faults, and know when to take any necessary corrective or preventive actions. For example, upon the system 100 detecting one or more faults in the fluid storage tank 102, the system 100 can perform subsequent actions and determinations and output associated information to be displayed via a display device 114 having the associated mobile application installed. For example, upon the system 100 detecting one or more faults in the fluid storage tank 102, the system 100 can determine the recommended corrective and/or preventive actions that an owner should take in order to resolve any fault and output all related information as a notification displayed via the mobile application. Optionally, the system 100 can output information to owners via the mobile application, including available technicians, pricing information of such technicians, ratings of such technicians, and the like. Optionally, the system 100 can identify any bare materials and/or tools necessary for such corrective and/or preventive actions via communication with a materials and/or tools database stored in the memory 110 of the controller 106 and output such information via the mobile application. Optionally, the controller 106 can output hyperlinks to vendors and/or other sellers of the bare materials and/or tools necessary for the corrective and/or preventive actions that a technician can use to purchase such bare materials and/or tools. Optionally, the system 100 can output a request for such materials and tools to a vendor and/or other seller, receive cost data related to such materials and tools, and/or filter to select the cheapest option or an option that aligns with predefined settings as identified by the technician via the mobile application. Optionally, in response to an owner requesting a technician to perform an inspection or maintenance via the mobile application, the system 100 can output such request directly to the technician via the mobile application. The technician can approve and/or decline the request via the mobile application and contact the owner for further information, as necessary.

During its lifespan, the fluid storage tank 102 can be subjected to strain from external stimulus, such as changes in pressure, loads, and/or temperature. By way of example, the multitude of heating cycles of a fluid storage tank 102 in a fluid heating device can result in strain (e.g., stress, wear, and the like) on the fluid storage tank 102. Strain on the fluid storage tank 102 can cause one or more faults in the fluid storage tank 102. For example, strain on the fluid storage tank 102 can cause the wall of the fluid storage tank 102 to flex and/or deform thereby potentially resulting in loss of the structural integrity of the wall of the fluid storage tank 102 over time. If the fluid storage tank 102 is continuously subjected to such strain over a period of time, the porcelain coating of the fluid storage tank 102 can develop one or more cracks. Such cracks can become an active site for corrosion which, over a period of continuous removal of the porcelain coating, can cause exposure of the bare material of the wall of the fluid storage tank 102 to the water therein. As more time passes and such corrosion is not resolved, faults of greater severity (e.g., microcracks, cracks, pin holes, and the like) can occur in the fluid storage tank 102. A crack and/or pin hole in the fluid storage tank 102 can result in a leak, which can ultimately cause significant property damage and financial losses. Accordingly, it can be critical to detect a fault (e.g., corrosion, microcracks, cracks, pin holes and the like) at an early stage (e.g., a pre-formative stage) and, optionally, provide an estimated amount of time until a fault (or a fault of a certain severity) in the fluid storage tank 102 occurs.

Figure 2:
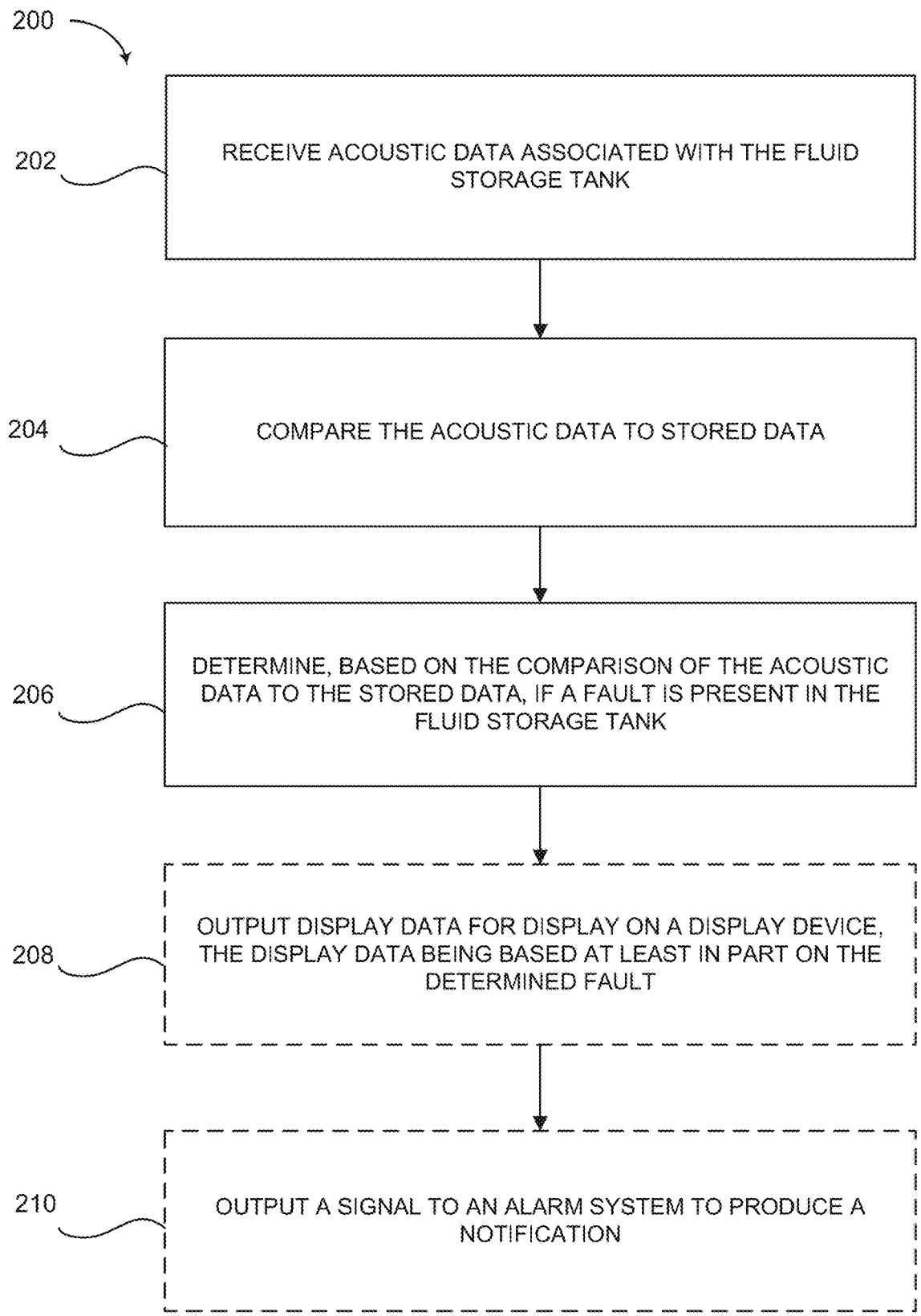
FIG. 2 is a flow diagram outlining an example method of monitoring and detecting a fault in a fluid storage tank, in accordance with the disclosed technology.

FIG. 2 is a flow diagram outlining a method 200 of monitoring and detecting a fault in the fluid storage tank 102. The method 200 can include receiving 202 (e.g., from a sensor 104) acoustic data indicative of sounds, vibration, and/or other elastic waves produced throughout the fluid storage tank 102. The sensor 104 can detect waveforms produced by the fluid storage tank 102 and convert the waveforms into electrical signals (e.g., acoustic data) that can be received and processed by the controller 106.

The sensor 104 can be configured to transmit acoustic data as the corresponding waveforms are detected (i.e., on a continuous basis), or the sensor 104 can be configured to transmit acoustic data periodically, such as at predetermined intervals (e.g., once an hour, once a day, once a week). While continuous transmission of acoustic data may enable a more accurate and timely fault detection system, periodic transmission can provide benefits such as reduced battery usage and the like. Alternatively, or in addition, the sensor 104 can record instantaneously occurring electrical signals continuously during a predetermined period of time and transmit the recorded acoustic data continuously during the predetermined period of time. Alternatively, or in addition, the sensor 104 can record instantaneously occurring electrical signals a predetermined number of times a day and transmit the recorded acoustic data a predetermined number of times a day.

As an example, the sensor 104 can record electrical signals every 15 minutes and can transmit the recorded acoustic data four times per day. Alternatively, or in addition, the sensor 104 can record electrical signals on an hourly basis and transmit the recorded acoustic data also on an hourly basis. Alternatively, or in addition, the sensor 104 can record electrical signals on a daily basis and transmit the recorded acoustic data on a weekly basis. Alternatively, or in addition, the sensor 104 can record electrical signals on a weekly basis and transmit the recorded acoustic data on a monthly basis.

Although specific examples of recording electrical signals produced or transmitted by one or more the fluid storage tank 102 and transmitting the recorded acoustic data are discussed above, any frequency of acoustic data recording (i.e., how often acoustic data is recorded) by the sensor 104 is herein contemplated. Similarly, any frequency of transmission of recorded acoustic data (i.e., how often acoustic data is transmitted) by the sensor 104 is also herein contemplated. Frequency of recordings and transmission can be adjusted depending on the level of specificity desired.

Optionally, the sensor 104 can amplify the acoustic data prior to transmitting it to the controller 106. By way of example, the acoustic data transmitted by the sensor 104 can be amplified through a preamplifier to enhance the voltage of the electrical signals, and thus, facilitate accurate processing of the acoustic data. The acoustic data transmitted by the sensor 104 can additionally be filtered to remove any extraneous noise. By way of example, the acoustic data can be filtered to remove any extraneous noise not associated with a fault of fluid storage tank 102 and/or low-frequency electrical signals indicative of background noise. Optionally, the pre-amplified, filtered acoustic data can be further amplified to further enhance the voltage of the electrical signals, and thus, facilitate accurate processing of the acoustic data. Optionally, some or all of these operations can be performed by the controller 106 upon receipt of the acoustic data.

When a fluid storage tank 102 is subjected to strain as discussed above, one or more faults can occur in the fluid storage tank 102. In such instances, the fluid storage tank 102 can produce a waveform(s) having different properties depending on the severity of the fault and/or the location of the fault. Thus, determination of the presence of a fault and/or identification of the type and/or severity of such fault can be made based on an analysis of acoustic data associated with the fluid storage tank 102. By way of example, as the fluid storage tank 102 can flex and/or deform due to strain from various external stimuli, thereby causing the structural integrity of the wall of the fluid storage tank 102 to decrease. Accordingly the resulting waveforms can have different characteristics (e.g., amplitude and frequency) as compared to waveforms produced by a fluid storage tank 102 under little to no strain and/or showing few, if any, signs of a fault. For example, as the structural integrity of the wall of the fluid storage tank 102 begins to decrease, the resulting waveforms can have increased amplitude and/or frequency as compared to waveforms produced by a fluid storage tank 102 under little to no strain and/or showing few, if any, signs of a fault. Optionally, the method can include analyzing (e.g., by the controller 106) the acoustic data to determine and/or calculate a characteristic (e.g., average signal level). For example, various signal processing techniques can be applied to the acoustic data, such as non-parametric signal processing, model-based signal processing, statistical signal processing, and/or nonlinear signal processing, to determine and/or calculate a characteristic, such as average signal level.

The method 200 can include comparing 204 (e.g., by the controller 106) the acoustic data to stored data. The acoustic data can be indicative of one or more waveform characteristics (e.g., amplitude and/or frequency) and the stored data can include such waveform characteristics corresponding to the waveform characteristics of the acoustic data. can be compared to one or more corresponding stored threshold values. Optionally, the stored data can include one or more stored threshold values such that the acoustic data can be compared to the one or more stored threshold values (e.g., frequency data from the acoustic data can be compared to one or more stored frequency threshold values and amplitude data from the acoustic data can be compared to one or more stored amplitude threshold values). The memory 110 of the controller 106 can store the stored data (e.g., the threshold values). The stored threshold values can include multiple threshold values. A stored threshold value can be indicative of no fault. Additionally, one or more stored threshold values can be indicative of different faults and/or different severities of a given fault. The acoustic data can include data indicative of various characteristics of the detected waveforms (e.g., amplitude and/or frequency), and the stored threshold values can similarly include one or more corresponding parameters. Optionally, a first threshold value (e.g., a first amplitude value and/or a first frequency value) can be indicative of a first fault (e.g., corrosion), a second threshold value (e.g., a second amplitude value and/or a second frequency value) can be indicative of a second fault (e.g., a microcrack), and a third threshold value (e.g., a third amplitude value and/or a third frequency value) can be indicative of a third fault (e.g., a crack). The various faults can be different types of faults and/or faults of differing severity. As a non-limiting example, the first fault can be of a first severity, the second fault can be of a second severity that is greater than the first severity, and the third fault can be of a third severity that is greater than the second severity.

The method 200 can further include determining 206, based on the comparison of the acoustic data to the stored data (e.g., stored threshold value(s)), if a fault is present in the fluid storage tank 102. If a predetermined amount of the acoustic data over a given time period includes a predetermined amount of data that is less than the first threshold value, then the controller 106 can determine there is no fault in the fluid storage tank 102. For example, if a predetermined percentage of the acoustic data is indicative of the detected waveform(s) having a frequency less than a first frequency threshold value and/or an amplitude less than a first amplitude threshold value over a given time period, then the controller 106 can determine there is no fault in the fluid storage tank 102. By way of example if at least 100%, at least 99%, at least 95%, at least 90%, at least 75%, at least 51%, or at least 50%, or any other predetermined percentage of the transmitted acoustic data is less than the first threshold value over 1 month, 1 day, 12 hours, 1 hour, or any other given time period, the controller 106 can determine there is no fault in the fluid storage tank 102. Optionally, the stored data can include a baseline indicative of a predetermined number of instances (e.g., 50, 40, 30, 20, or any other predetermined number) in which the acoustic data is indicative of the detected waveform(s) having a waveform characteristic (e.g., amplitude and/or frequency) that is greater than a first threshold value (e.g., first amplitude threshold value and/or first frequency threshold value) over a given period of time. If the transmitted acoustic data is indicative of the detected waveform(s) having a waveform characteristic that is greater than the first threshold value less than the baseline number of instances over a given time period, then the controller 106 can determine there is no fault in the fluid storage tank 102. As a non-limiting example, if the baseline is 40 instances and the acoustic data is indicative of a detected waveform(s) having 30 instances in which the amplitude of such detected waveform(s) exceeds the first amplitude threshold value over a period of 12 hours, the controller 106 can determine there is no fault in the fluid storage tank 102. The controller 106 can be configured to determine there is a first fault if the acoustic data includes at least a predetermined amount of data that is greater than the first threshold value over a given time period (e.g., at least a predetermined number of instances in which the waveform has a characteristic greater than a corresponding threshold over a given time period and/or a predetermined percentage of data over a given time period is greater than a corresponding threshold). Alternatively, or in addition, the controller 106 can be configured to determine there is a first fault if the acoustic data includes a predetermined amount of data that is greater than the first threshold value and less than a second threshold value over a given time period. By way of example, if at least 100%, at least 99%, at least 95%, at least 90%, at least 75%, at least 51%, at least 50%, or any other predetermined percentage of the transmitted acoustic data is greater than the first threshold value but less than the second threshold value over 1 month, 1 day, 12 hours, 1 hour, or any other given time period, the controller 106 can determine there is a first fault in the fluid storage tank 102. Alternatively or in addition, the stored data can include a baseline indicative of a predetermined number of instances (e.g., 50, 40, 30, 20, or any other predetermined number) in which the acoustic data is indicative of the detected waveform(s) having a waveform characteristic (e.g., amplitude and/or frequency) that is greater than the first threshold value and less than the second threshold value over a given period of time. If the transmitted acoustic data is indicative of a detected waveform(s) having a waveform characteristic that is greater than the first threshold value (but less than the second threshold value) a number of instances that is greater than the baseline number of instances over a given time period, then the controller 106 can determine there is a first fault in the fluid storage tank 102. As a non-limiting example, if the baseline is 40 instances and the acoustic data is indicative of a detected waveform(s) having 50 instances in which the amplitude of such detected waveform(s) exceeds the first amplitude threshold value over a period of 12 hours, the controller 106 can determine there is a first fault in the fluid storage tank 102.

The first fault can be indicative of corrosion of the fluid storage tank 102. Optionally, the first fault can be indicative of a predetermined severity of corrosion of the fluid storage tank 102. By way of example, the first threshold value can be indicative of approximately 0.1%, 0.5%, 1%, 5%, 10%, 20%, 30%, 40%, 50%, 60%, 70%, 80%, 90%, and/or 100% of the outer wall and/or inner wall of the wall of the fluid storage tank 102 being at least partially corroded and/or showing signs of corrosion. Alternatively, or in addition, the first threshold value can be indicative of a decrease in structural integrity of the wall of the fluid storage tank 102. For example, the first threshold value can be indicative of the thickness of the wall of the fluid storage tank 102 decreasing by approximately 0.25 millimeters, 0.5 millimeters, 1 millimeter, or any other predetermined amount as compared to the original thickness of the wall (e.g., a coating, such as porcelain, wearing away or otherwise becoming damaged such that its thickness and/or the overall wall thickness decreases).

The controller 106 can be configured to determine there is a second fault if the acoustic data includes at least a predetermined amount of data that is greater than a second threshold value but less than a third threshold value over a given period of time (e.g., at least a predetermined number of instances in which the waveform has a characteristic greater than a corresponding threshold over a given time period and/or a predetermined percentage of data over a given time period is greater than a corresponding threshold). Alternatively, or in addition, the controller 106 can be configured to determine there is a second fault of a second severity level if the acoustic data includes a predetermined amount of data that is greater than the second threshold value but less than the third threshold value over a given period of time. By way of example, if at least 100%, at least 99%, at least 95%, at least 90%, at least 75%, at least 51%, at least 50%, or any other predetermined percentage of the acoustic data is greater than the second threshold level and less than the third threshold level over 1 month, 1 day, 12 hours, or any other given period of time, the controller 106 can determine there is a second fault in the fluid storage tank 102. Alternatively or in addition, the stored data can include a baseline indicative of a predetermined number of instances (e.g., 50, 40, 30, 20, or any other predetermined number) in which the acoustic data is indicative of the detected waveform(s) having a waveform characteristic (e.g., amplitude and/or frequency) that is greater than the second threshold value and less than the third threshold value over a given period of time. If the transmitted acoustic data is indicative of detected waveform(s) having a waveform characteristic that is greater than the second threshold value (but less than the third threshold value) a number of instances that is greater than the baseline number of instances over a given time period, then the controller 106 can determine there is a second fault in the fluid storage tank 102. As a non-limiting example, if the baseline is 40 instances and the acoustic data is indicative of a detected waveform(s) having 50 instances in which the amplitude of such detected waveform(s) exceeds the second amplitude threshold value over a period of 12 hours, the controller 106 can determine there is a second fault in the fluid storage tank 102.

The second fault can have a greater severity level than the first fault. For example, the second fault can be indicative of a microcrack in the fluid storage tank 102. Optionally, the controller 106 can determine the extent of the severity of the second fault at least in part by determining the extent to which the transmitted acoustic data exceeds the second threshold value over a given period of time. For example, if the transmitted acoustic data is indicative of a small percentage (e.g., less than 50%, less than 40%, less than 25%, less than 5%, or any other percentage) of the detected waveforms having a waveform characteristic that is greater than the second threshold value but less than the third threshold value over a given period of time, then the second fault can be determined to be less severe as compared to if the transmitted acoustic data is indicative of a greater percentage (e.g., greater than 50%, greater than 60%, greater than 75%, greater than 95%, or any other percentage) of the detected waveforms having a waveform characteristic that is greater than the second threshold value but less than the third threshold value over a given period of time. Optionally, the controller 106 can determine the extent of the severity of the second fault by comparing the number of instances in which the detected waveforms have a waveform characteristic that is greater than the second threshold value but less than the third threshold value over a given period of time to a baseline number of instances. For example, if the baseline number of instances is 40 and the transmitted acoustic data is indicative of 50 instances in which the detected waveforms have a waveform characteristic greater than the second threshold value but less than the third threshold value over a given period of time, then the second fault can be determined to be less severe as compared to if the transmitted acoustic data is indicative of 60 instances in which the detected waveforms have a waveform characteristic greater than the second threshold value but less than the third threshold value over a given period of time.

The controller 106 can be configured to determine there is a third fault if the acoustic data includes at least a predetermined amount of data that is greater than the third threshold value (e.g., at least a predetermined number of instances in which the waveform has a characteristic greater than a corresponding threshold over a given time period and/or a predetermined percentage of data over a given time period is greater than a corresponding threshold). By way of example if at least 99%, at least 95%, at least 90%, at least 75%, at least 51%, at least 50%, or any other predetermined percentage of the acoustic data is greater than the third threshold value, the controller 106 can determine there is a third fault in the fluid storage tank 102. Alternatively or in addition, the stored data can include a baseline indicative of a predetermined number of instances (e.g., 50, 40, 30, 20, or any other predetermined number) in which the acoustic data is indicative of the detected waveform(s) having a waveform characteristic (e.g., amplitude and/or frequency) that is greater than the third threshold value over a given period of time. If the transmitted acoustic data is indicative of detected waveform(s) having a waveform characteristic that is greater than the third threshold value a number of instances that is greater than the baseline number of instances over a given time period, then the controller 106 can determine there is a third fault in the fluid storage tank 102. As a non-limiting example, if the baseline is 40 instances and the acoustic data is indicative of a detected waveform(s) having 50 instances in which the amplitude of such detected waveform(s) exceeds the third amplitude threshold value over a period of 12 hours, the controller 106 can determine there is a third fault in the fluid storage tank 102.

The third fault can have a greater severity than the first fault and the second fault. The third fault can be indicative of a crack in the fluid storage tank 102. Optionally, the controller 106 can determine the extent of the severity of the third fault at least in part by determining the extent to which the transmitted acoustic data exceeds the third threshold value over a given period of time. For example, if the transmitted acoustic data is indicative of a small percentage (e.g., less than 50%, less than 40%, less than 25%, less than 5%, or any other percentage) of the detected waveforms having a waveform characteristic that is greater than the third threshold value over a given period of time, then the third fault can be determined to be less severe as compared to if the transmitted acoustic data is indicative of a greater percentage (e.g., greater than 50%, greater than 60%, greater than 75%, greater than 95%, or any other percentage) of the detected waveforms having a waveform characteristic that is greater than the third threshold value over a given period of time. Optionally, the controller 106 can determine the extent of the severity of the third fault by comparing the number of instances in which the detected waveforms have a waveform characteristic that is greater than the third threshold value over a given period of time to a baseline number of instances. For example, if the baseline number of instances is 40 and the transmitted acoustic data is indicative of 75 instances in which the detected waveforms have a waveform characteristic greater than the third threshold value over a given period of time, then the third fault can be determined to be less severe as compared to if the transmitted acoustic data is indicative of 100 instances in which the detected waveform(s) have a waveform characteristic greater than the third threshold value over a given period of time.

The step of determining if a fault is present in the fluid storage tank 102 as discussed is based at least in part on the amount of data that is greater than a stored threshold value over a given period of time (e.g., at least a predetermined number of instances in which the waveform has a characteristic greater than a corresponding threshold over a given time period and/or a predetermined percentage of data over a given time period is greater than a corresponding threshold. However, it is contemplated that other metrics can be used. For example, the number of instances over a predetermined number of waveforms and/or cycles of waveforms can be used to determine if a fault is present in the fluid storage tank 102.

Figure 3:
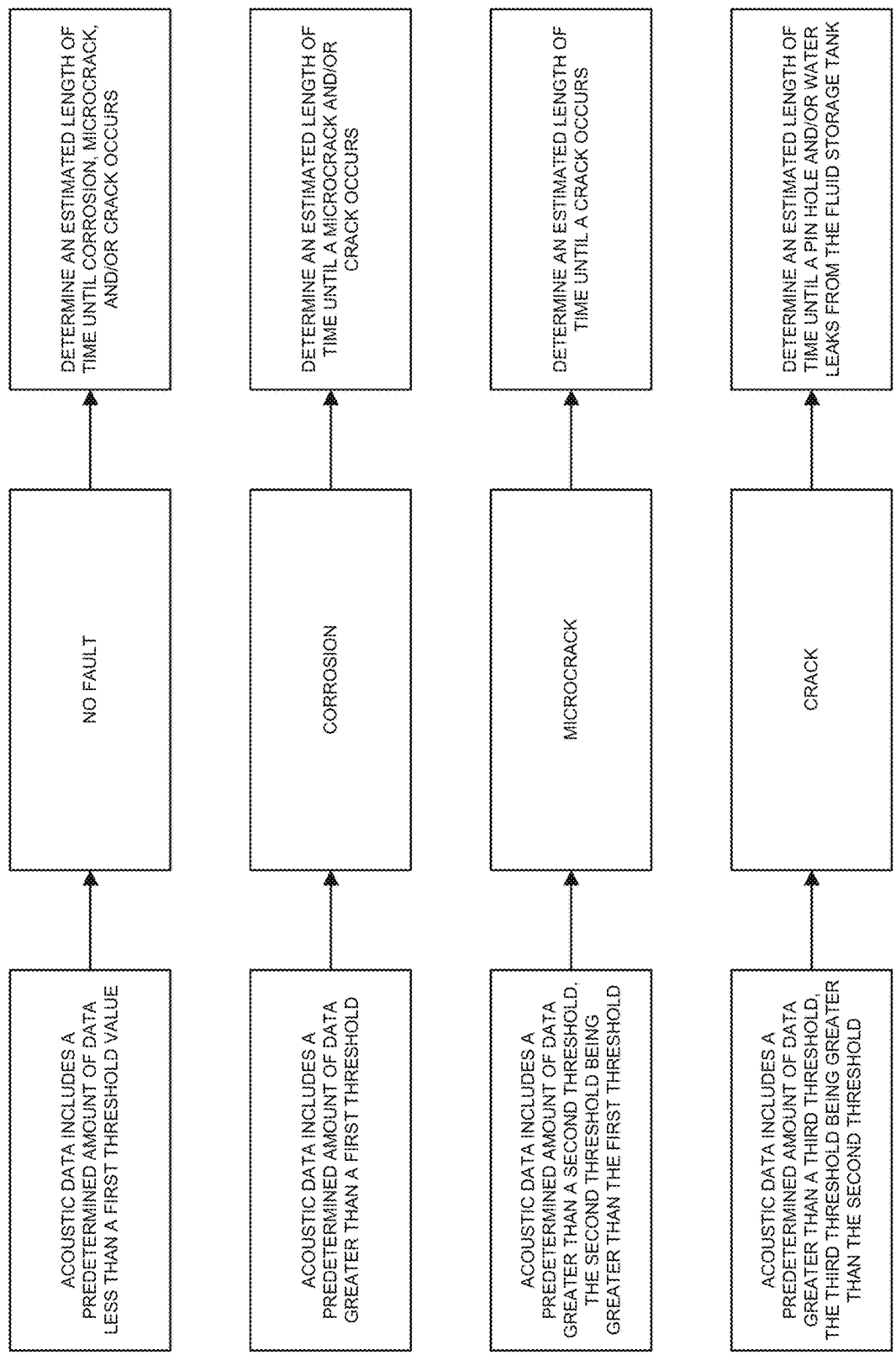
FIG. 3 is a series of flow diagrams illustrating example methods for determining an estimated amount of time until a fault of varying severity occurs, in accordance with the disclosed technology.

Optionally, the controller 106 can further determine an estimated amount of time until a fault occurs, as illustrated in FIG. 3. By way of example, the controller 106 can be configured to compare the acoustic data to a model based on historical data to determine an estimated amount of time until a fault occurs. Such historical data can be based at least in part on laboratory testing of fluid storage tanks 102 of various sizes in which the fluid storage tanks 102 were subjected to selective levels of strain to produce faults of varying severity in a controlled manner. If the acoustic data includes at least a predetermined amount of data that is less than the first threshold value, and thus, is indicative of no faults in the fluid storage tank 102, the controller 106 can further determine an estimated amount of time until the first fault (e.g., corrosion), the second fault (e.g., a microcrack) and/or the third fault (e.g., a crack) occurs. By way of example, the controller 106 can determine how close the acoustic data is to reaching each threshold value. Based on such determination, the controller 106 can estimate an amount of time until the respective fault occurs, and accordingly, provide an estimated amount time of approximately one day, one week, one month, one year, or any other amount of time until the first fault, second fault, and/or third fault occurs.

Similarly, if the acoustic data includes a predetermined amount of data that is greater than a first threshold value but less than a second threshold value, and thus, is indicative of a first fault in the fluid storage tank 102, the controller 106 can further determine an estimated amount of time until the second fault (e.g., a microcrack) and/or the third fault (e.g., a crack) occurs. By way of example, the controller 106 can determine how close the acoustic data is to reaching the second threshold value and/or the third threshold value. Based on such determination, the controller 106 can estimate an amount of time until the second fault and/or the third fault, respectively, occurs, and accordingly provide an estimated amount of time of approximately one day, one week, one month, one year, or any other amount of time until the second fault and/or third fault occurs. During such amount of time, an owner and/or technician can repair and/or replace the fluid storage tank 102 such that any faults already in existence are resolved and potential faults are prevented and/or mitigated.

If the acoustic data includes a predetermined amount of data that is greater than a second threshold value but less than a third threshold value, and thus, is indicative of a second fault in the fluid storage tank 102, the controller 106 can further determine an estimated amount of time until the third fault (e.g., a crack) occurs. By way of example, the controller 106 can determine how close the acoustic data is to reaching the third threshold value. Based on such determination, the controller 106 can estimate an amount of time until the third fault occurs, and accordingly provide an estimated amount of time of approximately one day, one week, one month, one year, or any other amount of time until the third fault occurs. During such amount of time, an owner and/or technician can repair and/or repair the fluid storage tank 102 such that any faults already in existence are resolved and potential faults are prevented and/or mitigated.

Optionally, if the acoustic data includes a predetermined amount of data that is greater than a third threshold value, and thus, is indicative of a third fault in the fluid storage tank 102, the controller 106 can further determine an estimated amount of time until the third fault (e.g., a crack) develops into a pin hole. Alternatively or in addition, the controller 106 can further determine an estimated amount of time until the water within the fluid storage tank 102 begins to leak (e.g., an estimated amount of time until a predetermined amount of water has leaked from the fluid storage tank and/or an estimated amount of time until all of the water within the fluid storage tank 102 has leaked from the fluid storage tank 102).

Optionally, if the fluid storage tank 102 is a component of a fluid heating device or other appliance configured to handle fluid, if the acoustic data includes a predetermined amount of data that is greater than a third threshold value, and thus, is indicative of a third fault (e.g., a crack) in the fluid storage tank 102, the controller 106 can output a signal to the fluid heating device or other appliance to cease operation. By way of example, the controller 106 can output a signal to a fluid heating device to cease the inflow of fluid and/or drain the fluid being stored within the fluid storage tank 102.

Optionally, the method 200 can include outputting display data for display on a display device 114. The display data can be based at least in part on the determined fault. By way of example, the display data can indicate whether a fault is present in the fluid storage tank 102, and, if so, the level of severity of the fault (e.g., corrosion, a microcrack, and/or a crack) and the recommended corrective and/or preventive actions to take. Additionally, the display data can indicate an estimated amount of time until a fault occurs and/or a fault of greater severity occurs. Optionally, the display data can include technician and/or manufacturer contact information such that, based on the display data, an owner can contact the appropriate person to take the necessary steps to prevent and/or mitigate faults in the fluid storage tank 102. Optionally, the display data can include further information pertaining to various technicians and/or manufacturers capable of performing the recommended corrective and/or preventing actions, including pricing, upcoming availability, ratings from past engagements, and the like. Optionally, the user interface 116 of the display device 114 can include selectable graphical inputs (e.g., graphical buttons and/or icons capable of being pressed, tapped, or clicked). An owner can use such selectable graphical inputs to initiate a call, chat, or message with a technician or manufacturer when the display data indicates a fault is present in the fluid storage tank 102. An owner can further use such selectable graphical inputs to initiate a scheduling request with a technician or manufacturer when the display data indicates a fault is present in the fluid storage tank 102. When a technician services the fluid storage tank 102 for a fault, the technician can use the display data indicating the severity of the fault and/or estimated amount of time until a fault or fault of greater severity occurs to efficiently and effectively perform all necessary maintenance tasks.

Optionally, the method 200 can include outputting a signal to the alarm system 112 to produce a notification. The notification can be text-based and/or an audible sound. In response to the notification, a user can perform the necessary maintenance tasks and/or contact a technician to perform such tasks. Optionally, the processor 108 can be configured to output a signal to the alarm system 112 to produce a notification in advance of the acoustic data exceeding a stored threshold value. For example, the processor 108 can be configured to output a signal to the alarm system 112 to produce a notification when the acoustic data is within a predetermined range of a stored threshold value. In such configuration, the user can ensure all necessary maintenance tasks are performed prior to a fault in the fluid storage tank 102 occurring and/or prior to a fault of greater severity occurring.

Figure 4A:
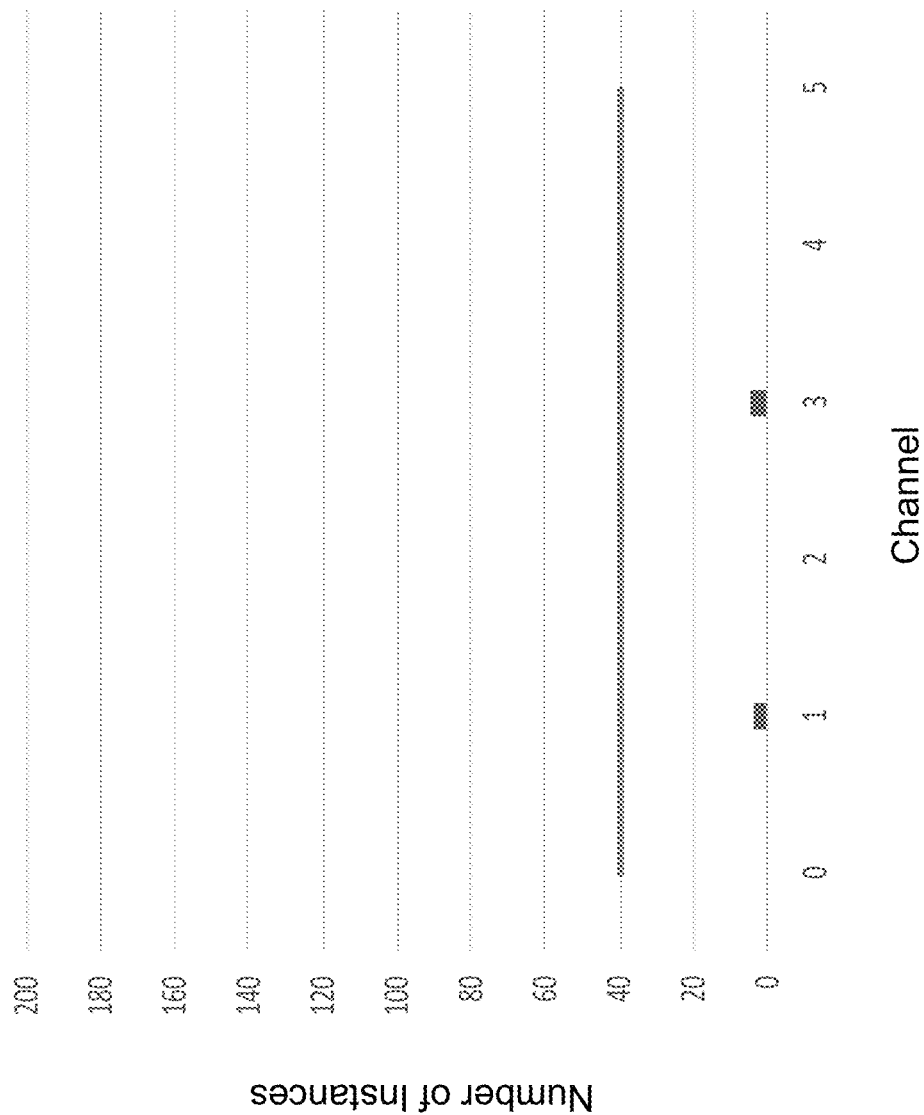
FIG. 4A is a chart illustrating example acoustic data associated with a determination that there are no faults in a fluid storage tank, in accordance with the disclosed technology.

FIG. 4A is a chart illustrating an example system 100 when no faults are detected in the fluid storage tank 102. The example system 100 is a multichannel system having a stored baseline of 40 instances. Accordingly, the acoustic data must be indicative of at least 40 instances in which the detected waveform(s) has a waveform characteristic (e.g., amplitude and/or frequency) that exceeds a stored threshold value (e.g., stored amplitude threshold value and/or stored frequency threshold value). The stored threshold value can be indicative of a fault (e.g., a first fault, second fault, third fault, or the like) in the system 100. As illustrated in FIG. 4A, neither channel of the system 100 indicates the acoustic data is indicative of the detected waveform(s) having a waveform characteristic that exceeds the stored threshold value over 40 times. Accordingly, the system 100 can determine no fault is present.

Figure 4B:
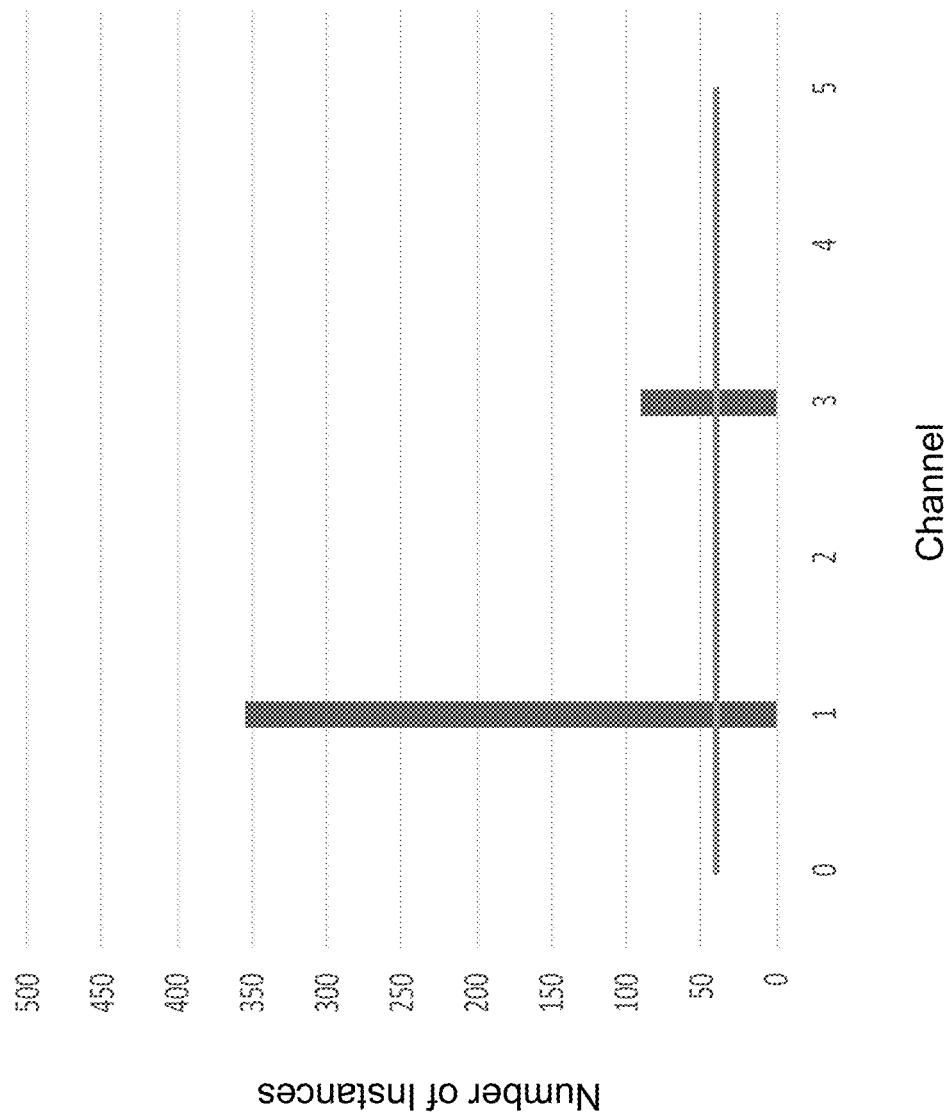
FIG. 4B is a chart illustrating example acoustic data associated with a determination that there is a fault in a fluid storage tank, in accordance with the disclosed technology.

FIG. 4B is a chart illustrating an example system 100 when a fault is detected in the fluid storage tank 102. As in FIG. 4A, the system 100 is a multichannel system having a stored baseline of 40 instances. As illustrated in FIG. 4B, each channel indicates the acoustic data is indicative of the detected waveform(s) having greater than 40 instances in which the waveform characteristics (e.g., amplitude and/or frequency) of the detected waveform(s) exceeds the stored threshold value. Thus, the system 100 indicates a fault is present.

Such acoustic emission technique as described herein to monitor and detect faults of a fluid storage tank 102 can provide a passive, non-destructive mechanism for globally monitoring the health of the fluid storage tank. This technique can detect small-scale damage of a fluid storage tank 102 such that failure of the fluid storage tank 102 can be prevented. Upon detection of a fault of any severity, an owner can ensure all necessary maintenance steps are completed in order to mitigate and/or prevent financial and property damage that can result from a water leak of the fluid storage tank.

Certain examples and implementations of the disclosed technology are described above with reference to block and flow diagrams according to examples of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams do not necessarily need to be performed in the order presented, can be repeated, or do not necessarily need to be performed at all, according to some examples or implementations of the disclosed technology. It is also to be understood that the mention of one or more method steps does not preclude the presence of additional method steps or intervening method steps between those steps expressly identified. Additionally, method steps from one process flow diagram or block diagram can be combined with method steps from another process diagram or block diagram. These combinations and/or modifications are contemplated herein.

What is claimed is:

1. A system comprising:
a fluid storage tank;
a sensor positioned proximate the fluid storage tank, the sensor being configured to detect vibrations associated with the fluid storage tank and output vibration data indicative of the detected vibrations, the vibration data comprising at least one waveform characteristic;
a processor; and
a non-transitory computer-readable medium that stores instructions that, when executed by the processor, cause the system to:
receive the vibration data;
compare the vibration data to stored data, the stored data comprising at least one waveform characteristic corresponding to the at least one waveform characteristic of the vibration data, and the at least one waveform characteristic of the stored data being indicative of vibrations associated with a fault in the fluid storage tank;
determine, based on the comparison of the vibration data to the stored data, whether the fault is present in the fluid storage tank;
determine the vibration data includes a predetermined amount of detected vibrations greater than a first threshold value over a first predetermined period of time; and
determine the fault is a first fault having a first level of severity.

2. The system of claim 1, wherein the sensor is a piezoelectric sensor.

3. The system of claim 1, wherein the fault is at least one of corrosion, a microcrack, or a crack.

4. The system of claim 1, wherein the sensor records the vibration data over the first predetermined period of time.

5. The system of claim 1, wherein the sensor transmits the vibration data a predetermined number of times during the first predetermined period of time.

6. The system of claim 1, wherein:
determining the fault is the first fault having the first level of severity is based at least in part on a determination that the vibration data includes the predetermined amount of detected vibrations greater than the first threshold value and less than a second threshold value over the first predetermined period of time, the second threshold value being greater than the first threshold value, and
the instructions, when executed by the processor further cause the system to:
determine the vibration data includes a predetermined amount of detected vibrations greater than the second threshold value over a second predetermined period of time; and
determine the fault is a second fault having a second level of severity, the second level of severity being greater than the first level of severity.

7. The system of claim 6, wherein:
determining the fault is the second fault having the second level of severity is based at least in part on a determination that the vibration data includes the predetermined amount of detected vibrations greater than the second threshold value and less than a third threshold value over the second predetermined period of time, the third threshold value being greater than the second threshold value, and
the instructions, when executed by the processor further cause the system to:
determine the vibration data includes a predetermined amount of detected vibrations greater than the third threshold value over a third predetermined period of time; and
determine the fault is a third fault having a third level of severity, the third level of severity being greater than the second level of severity.

8. The system of claim 7, wherein the first fault is corrosion, the second fault is a microcrack, and the third fault is a crack.

9. The system of claim 1, wherein the instructions, when executed by the processor further cause the system to:
determine the first fault having the first level of severity is present in the fluid storage tank; and
determine an estimated amount of time until a second fault of a second level of severity occurs in the fluid storage tank, the second level of severity being greater than the first level of severity.

10. The system of claim 1, wherein the instructions, when executed by the processor further cause the system to output display data for display on a display device, the display data being based at least in part on the determined fault.

11. The system of claim 1, wherein the instructions, when executed by the processor further cause the system to output a signal to an alarm system to produce a notification in response to determining the fault is present in the fluid storage tank.

12. A method of monitoring and detecting a fault in a fluid storage tank, the method comprising:
receiving, from a sensor, vibration data, the vibration data being indicative of one or more detected vibrations associated with the fluid storage tank, the vibration data comprising at least one waveform characteristic;
comparing the vibration data to stored data, the stored data comprising at least one waveform characteristic corresponding to the at least one waveform characteristics of the vibration data, and the at least one waveform characteristic of the stored data being indicative of vibrations associated with a fault in the fluid storage tank;
determining, based on the comparison of the vibration data to the stored data, whether the fault is present in the fluid storage tank;
determining the fault present in the fluid storage tank is a first fault having a first level of severity; and
determining an estimated amount of time until a second fault having a second level of severity occurs in the fluid storage tank, the second level of severity being greater than the first level of severity.

13. The method of claim 12, further comprising:
determining the vibration data includes a predetermined amount of detected vibrations greater than a first threshold value over a first predetermined period of time; and
determining the fault is the first fault having the first level of severity.

14. The method of claim 13, wherein determining the fault is the first fault having the first level of severity is based at least in part on a determination that the vibration data includes the predetermined amount of detected vibrations greater than the first threshold value and less than a second threshold value over the first predetermined period of time, the second threshold value being greater than the first threshold value, the method further comprising:
determining the vibration data includes a predetermined amount of detected vibrations greater than a second threshold value over a second predetermined period of time; and
determining the fault is a second fault having a second level of severity, the second level of severity being greater than the first level of severity.

15. The method of claim 14, wherein determining the fault is the second fault having the second level of severity is based at least in part on a determination that the vibration data includes the predetermined amount of detected vibrations greater than the second threshold value and less than a third threshold value over the second predetermined period of time, the third threshold value being greater than the second threshold value, the method further comprising:
determining the vibration data includes a predetermined amount of detected vibrations greater than the third threshold value over a third predetermined period of time; and
determining the fault is a third fault having a third level of severity, the third level of severity being greater than the second level of severity.

16. The method of claim 12, further comprising outputting display data for display on a display device, the display data being based at least in part on the determined fault.

17. A system comprising:
a fluid storage tank;
a sensor positioned proximate the fluid storage tank, the sensor being configured to detect vibrations associated with the fluid storage tank and output vibration data indicative of the detected vibrations;
a processor; and
a non-transitory computer-readable medium that stores instructions that, when executed by the processor, cause the system to:
receive the vibration data;
compare the vibration data to stored data; and
determine, based on the comparison of the vibration data to the stored data, whether a fault is present in the fluid storage tank, wherein the fault is at least one of corrosion, a microcrack, or a crack;
determine the vibration data includes a predetermined amount of detected vibrations greater than a threshold value over a predetermined period of time; and
determine the fault has a first level of severity.

18. A system comprising:
a fluid storage tank;
a sensor positioned proximate the fluid storage tank, the sensor being configured to detect vibrations associated with the fluid storage tank and output vibration data indicative of the detected vibrations;
a processor; and
a non-transitory computer-readable medium that stores instructions that, when executed by the processor, cause the system to:
receive the vibration data;
compare the vibration data to stored data;
determine, based on the comparison of the vibration data to the stored data, whether a fault is present in the fluid storage tank;
determine a first fault having a first level of severity is present in the fluid storage tank; and
determine an estimated amount of time until a second fault of a second level of severity occurs in the fluid storage tank, the second level of severity being greater than the first level of severity.

19. A system comprising:
a fluid storage tank;
a sensor positioned proximate the fluid storage tank, the sensor being configured to detect vibrations associated with the fluid storage tank and output vibration data indicative of the detected vibrations;
a processor; and
a non-transitory computer-readable medium that stores instructions that, when executed by the processor, cause the system to:
receive the vibration data;

compare the vibration data to stored data;
determine, based on the comparison of the vibration data to the stored data, whether a fault is present in the fluid storage tank;
determine the vibration data includes a predetermined amount of detected vibrations greater than a threshold value over a predetermined period of time; and
determine the fault has a first level of severity; and
output display data for display on a display device, the display data being based at least in part on the determined fault.

20. A system comprising:
a fluid storage tank;
a sensor positioned proximate the fluid storage tank, the sensor being configured to detect vibrations associated with the fluid storage tank and output vibration data indicative of the detected vibrations;
a processor; and
a non-transitory computer-readable medium that stores instructions that, when executed by the processor, cause the system to:
receive the vibration data;
compare the vibration data to stored data;
determine, based on the comparison of the vibration data to the stored data, whether a fault is present in the fluid storage tank;
determine the vibration data includes a predetermined amount of detected vibrations greater than a threshold value over a predetermined period of time; and
determine the fault has a first level of severity; and
output a signal to an alarm system to produce a notification in response to determining the fault is present in the fluid storage tank.

* * * * *